United States Patent
Yasukuni

[11] 4,054,371
[45] Oct. 18, 1977

[54] COMPACT VARIFOCAL LENS SYSTEM CAPABLE OF MACROPHOTOGRAPHY

[75] Inventor: Mitsuo Yasukuni, Osaka, Japan

[73] Assignee: Minolta Camera Kabushiki Kaisha, Osaka, Japan

[21] Appl. No.: 642,459

[22] Filed: Dec. 19, 1975

[30] Foreign Application Priority Data

Dec. 28, 1974 Japan .................................. 50-565

[51] Int. Cl.² ............................................. G01B 15/18
[52] U.S. Cl. ................................. 350/184; 350/186; 350/187
[58] Field of Search ........................ 350/184, 186, 187

[56] References Cited

U.S. PATENT DOCUMENTS

| 3,603,669 | 9/1971 | Lai et al. | 350/186 |
| 3,655,271 | 4/1972 | Suzuki | 350/187 |
| 3,661,445 | 5/1972 | Someya | 350/186 |
| 3,912,376 | 10/1975 | Ogura | 350/186 |

FOREIGN PATENT DOCUMENTS 2,422,662   1973   Germany

*Primary Examiner*—Conrad J. Clark
*Attorney, Agent, or Firm*—Harold L. Jackson; Stanley R. Jones; Joseph W. Price

[57] ABSTRACT

A compact varifocal lens system, such as a zoom lens assembly, is provided having a front focusing lens component of negative refractive power, a variator lens component of positive refractive power, a compensator lens component of negative refractive power and a master lens component. The lens assembly has a compact configuration and further, provides a highly desirable macrophotography capability. The macrophotography mode of operation can be effected by fixing one of the variator and compensator lens components, or by separating one of the variator and compensator lens components into positive and negative subcomponents with a predetermined relative positioning of the subcomponents to provide a close-up focusing.

19 Claims, 52 Drawing Figures

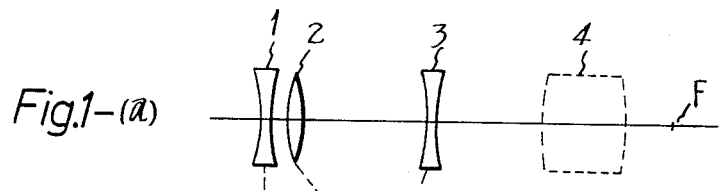
Fig.1-(a)
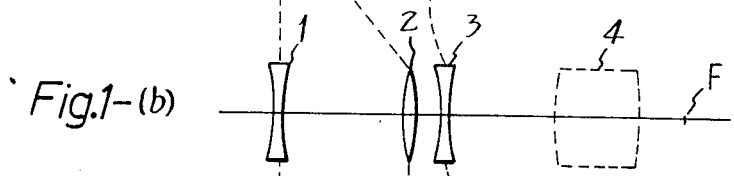
Fig.1-(b)
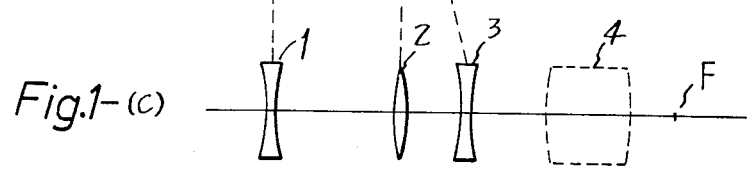
Fig.1-(c)
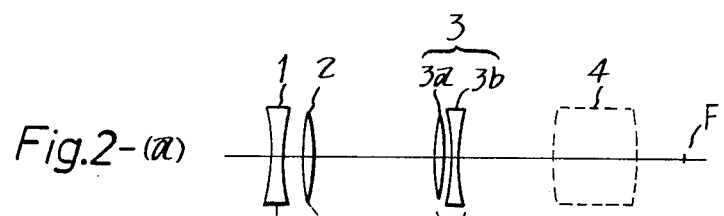
Fig.2-(a)
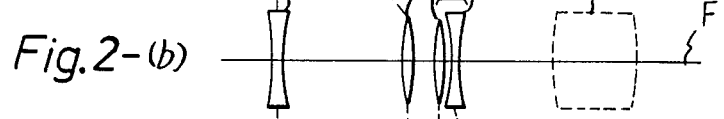
Fig.2-(b)
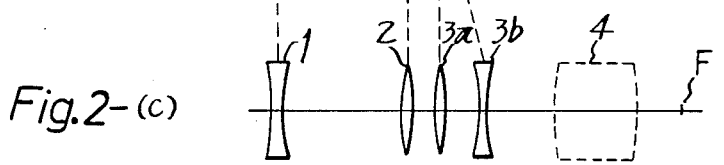
Fig.2-(c)

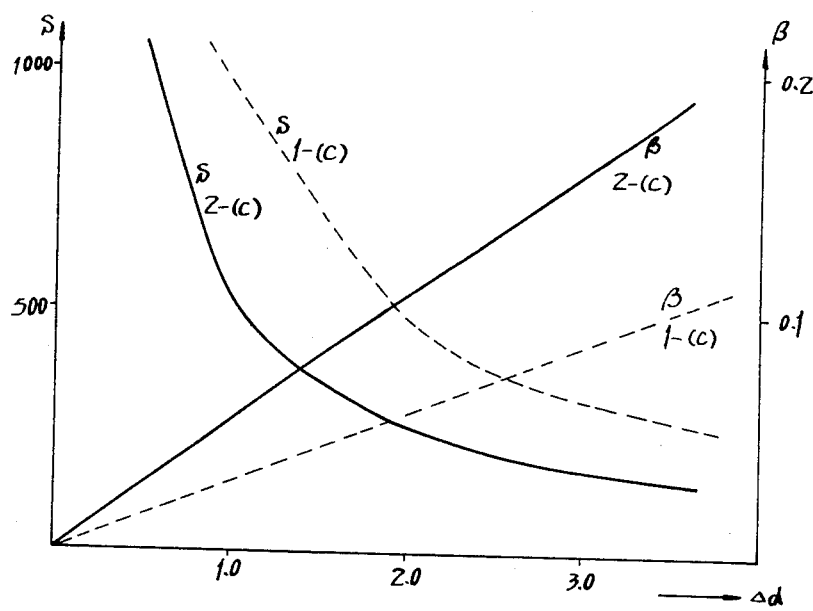
Fig.3
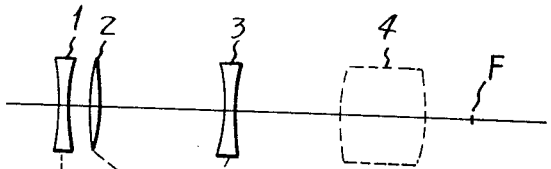
Fig.4-(a)
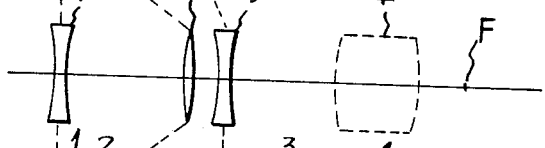
Fig.4-(b)
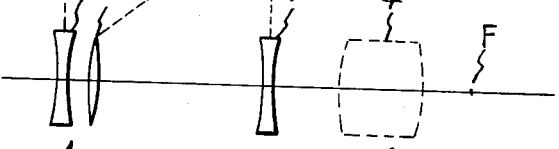
Fig.4-(c)
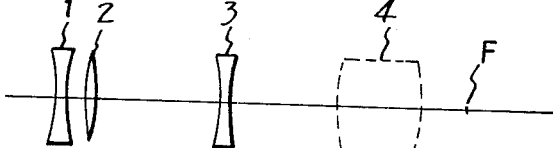
Fig.4-(d)

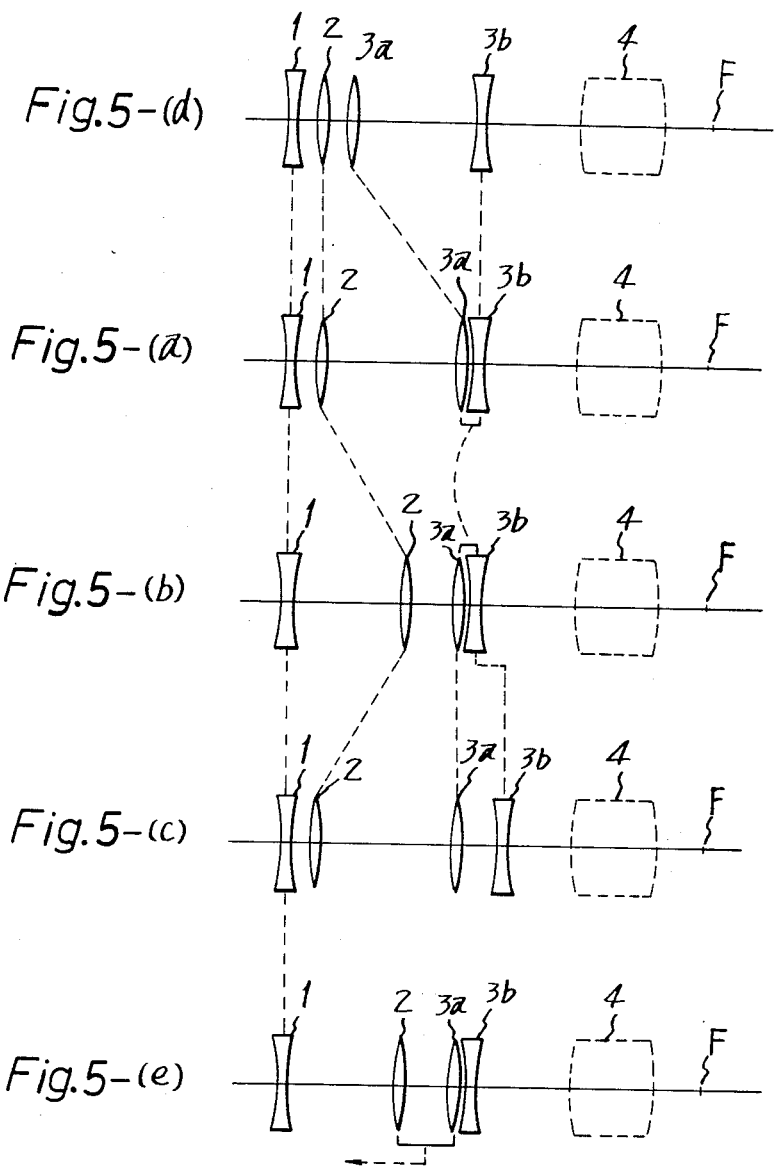

Fig.6-(a)
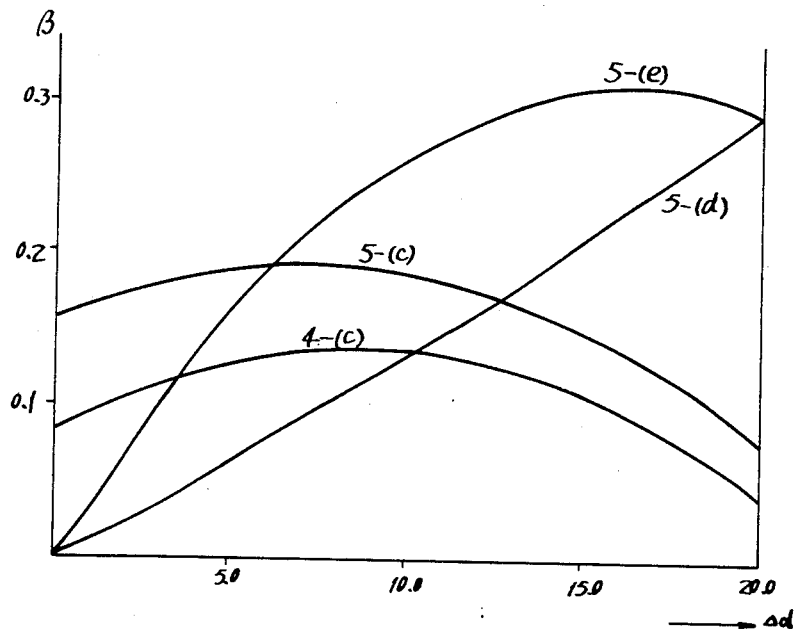
Fig.6-(b)
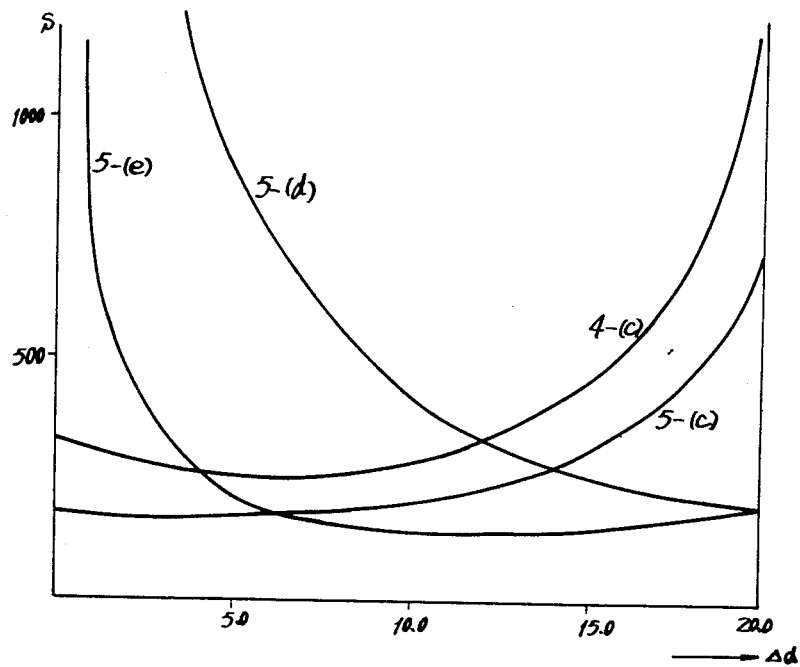

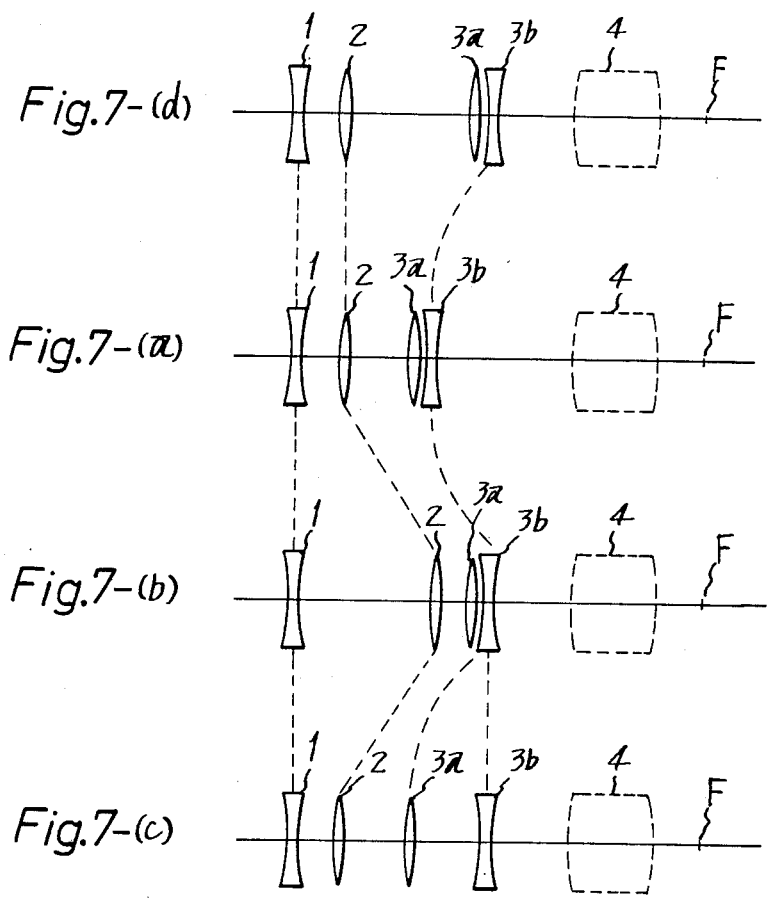

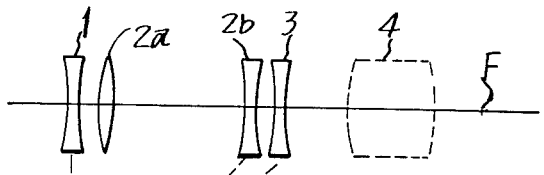
Fig.8-(d)
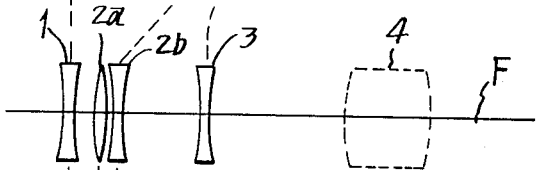
Fig.8-(a)
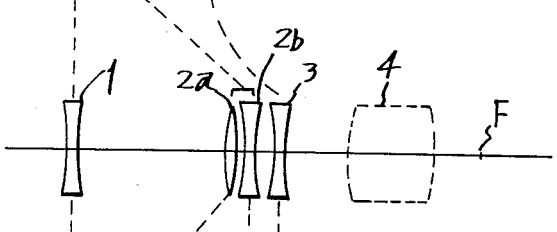
Fig.8-(b)
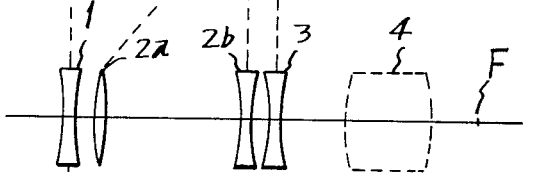
Fig.8-(c)
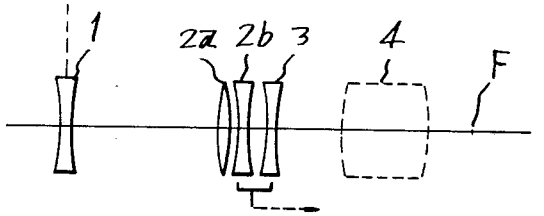
Fig.8-(e)

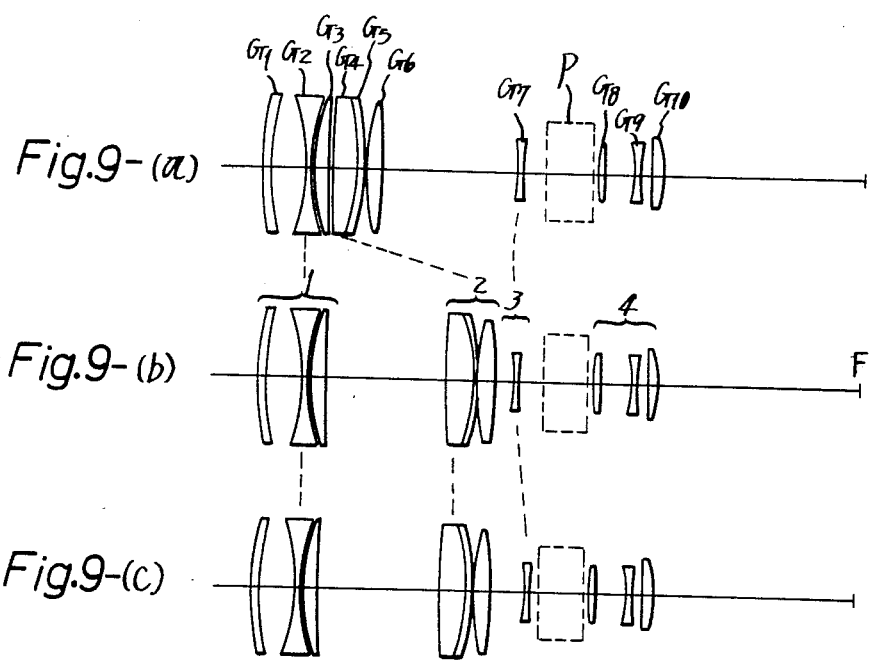
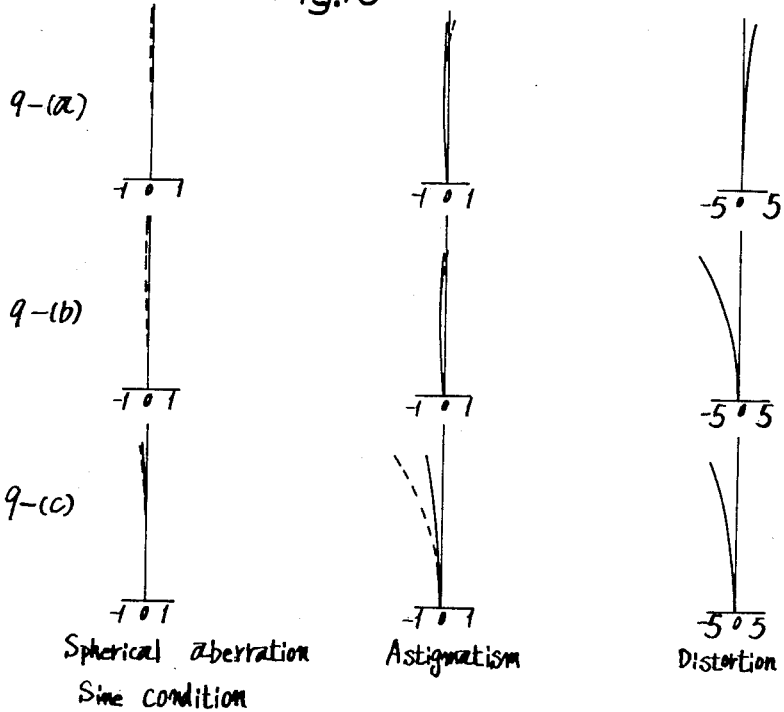

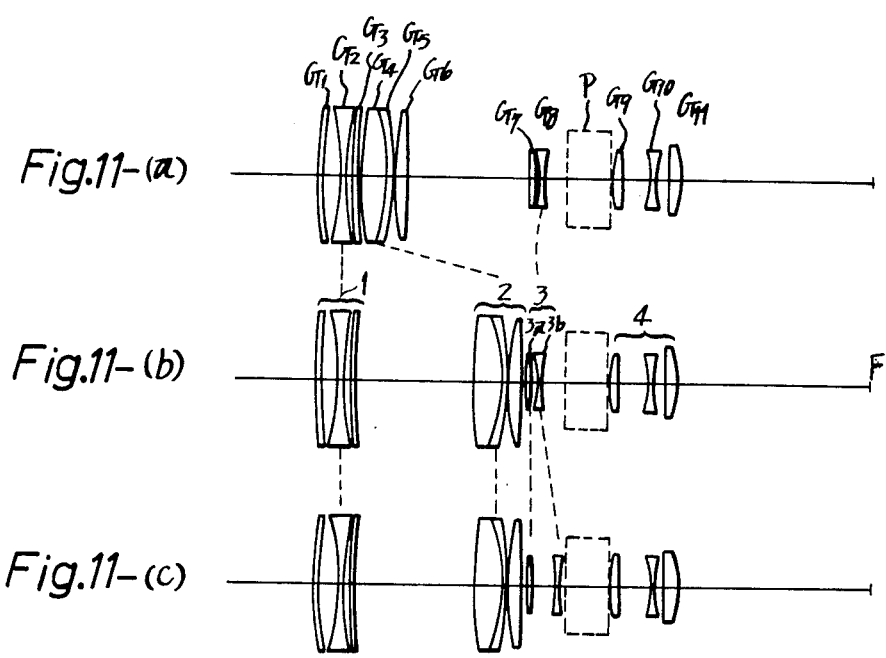
Fig.11-(a)
Fig.11-(b)
Fig.11-(c)
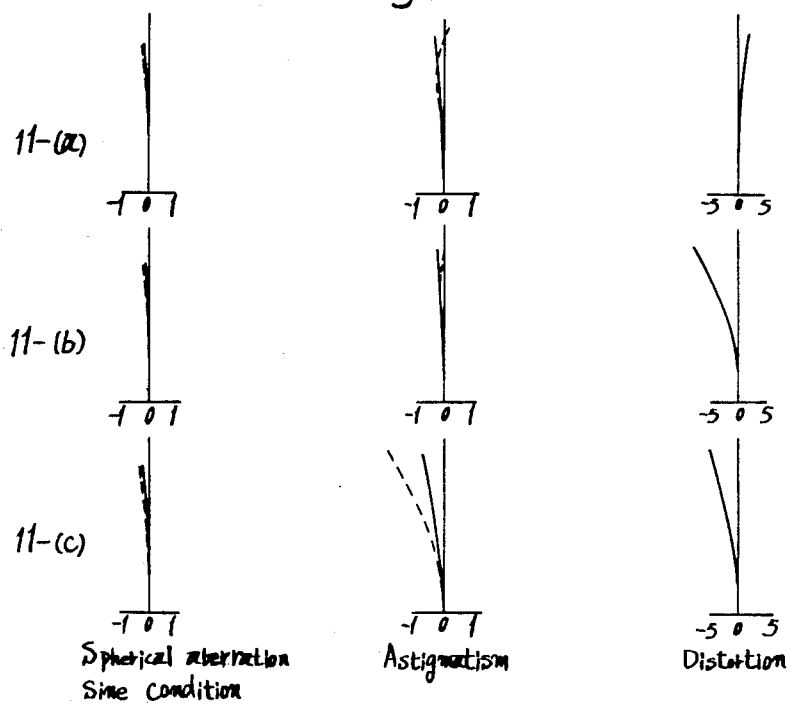
Fig.12

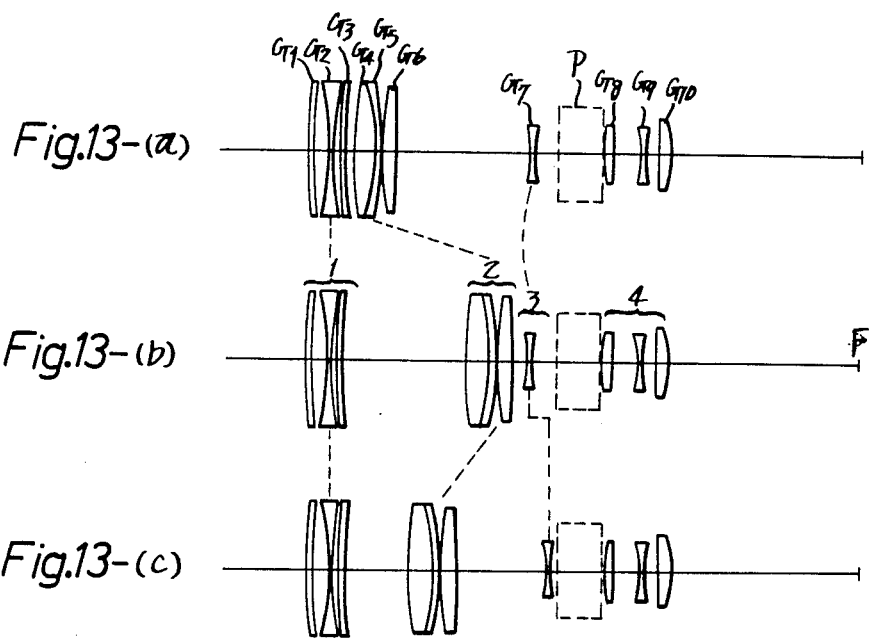
Fig.13-(a)
Fig.13-(b)
Fig.13-(c)
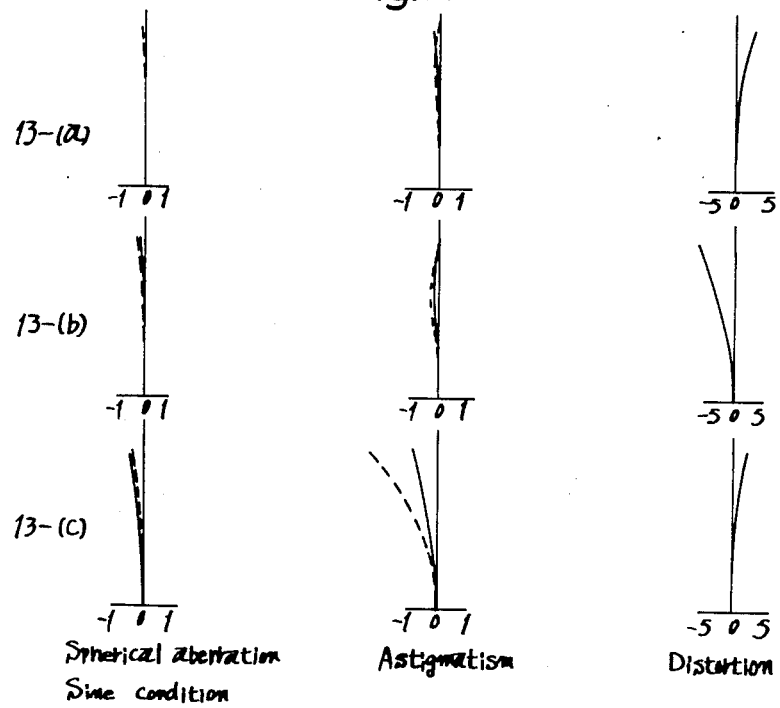
Fig.14
Spherical aberration
Sine condition
Astigmatism
Distortion Fig.15-(c)
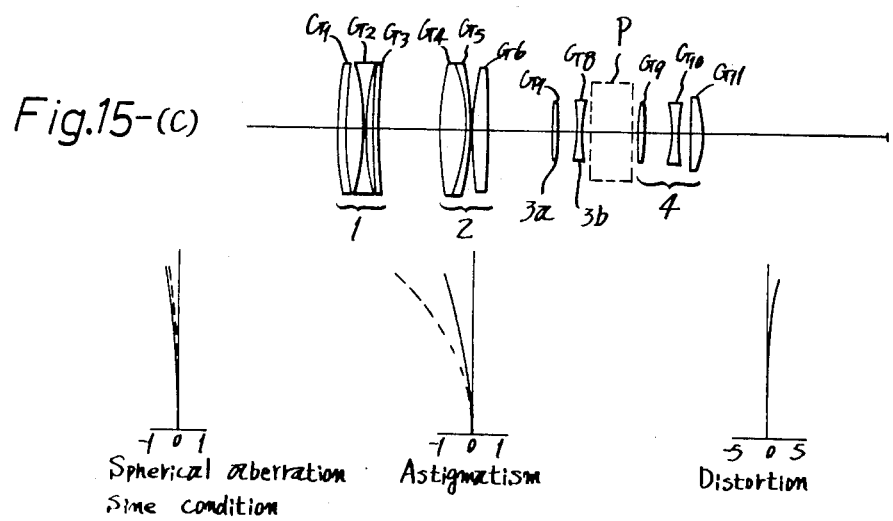
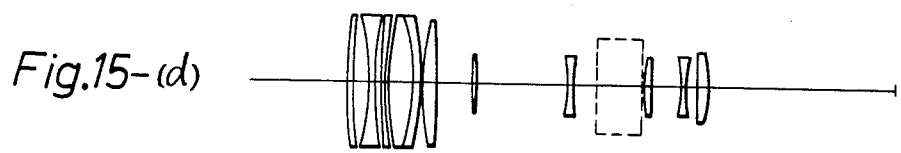
Spherical aberration  Astigmatism  Distortion
Sine condition
Fig.15-(d)
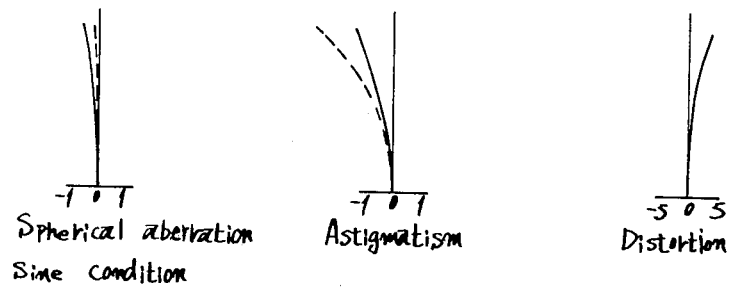
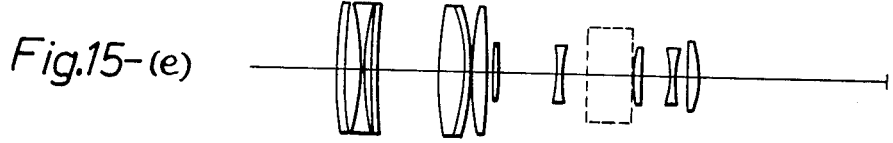
Spherical aberration  Astigmatism  Distortion
Sine condition
Fig.15-(e)
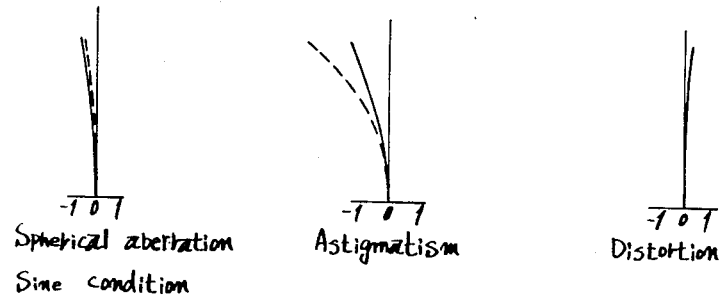
Spherical aberration  Astigmatism  Distortion
Sine condition

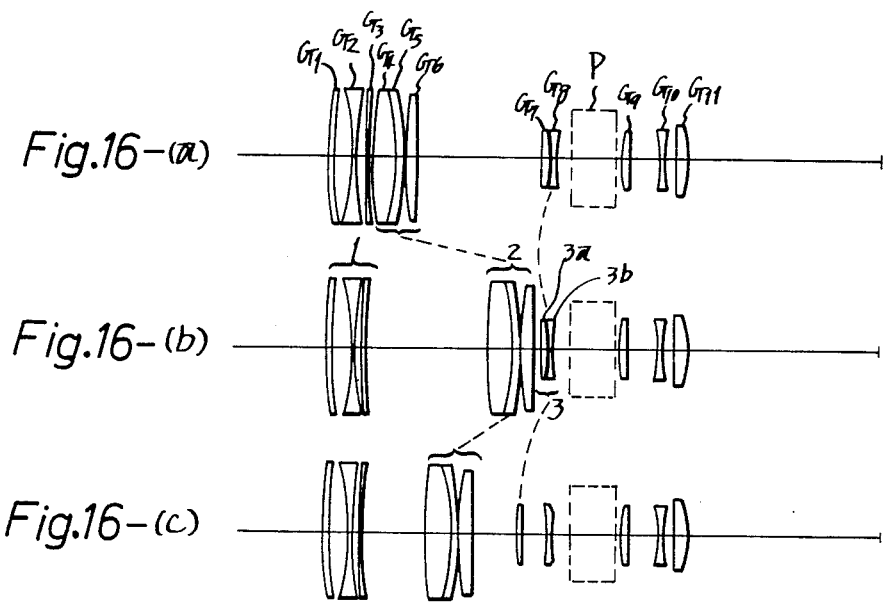
Fig.16-(a)
Fig.16-(b)
Fig.16-(c)
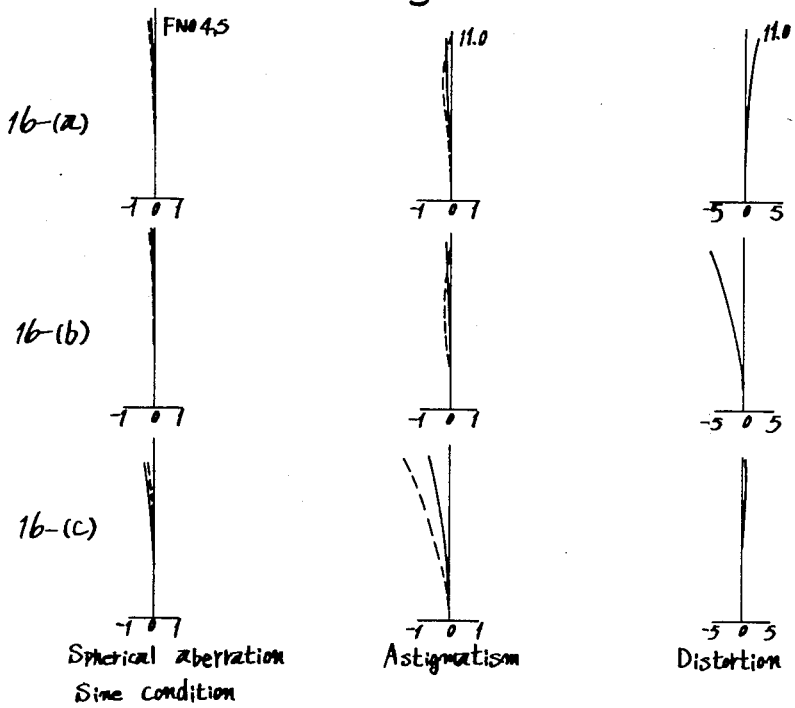
Fig.17

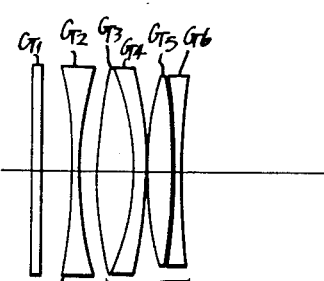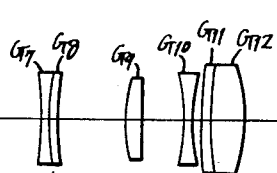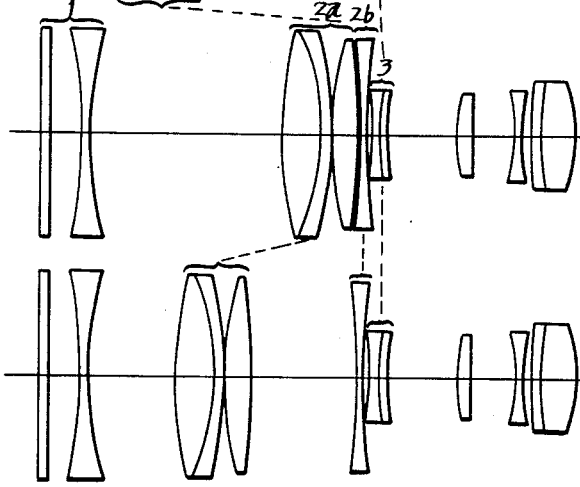
Fig.18-(a)
Fig.18-(b)
Fig.18-(c)
Fig.19
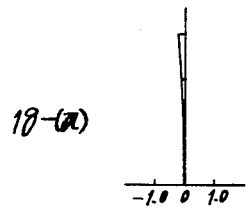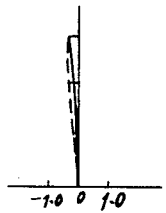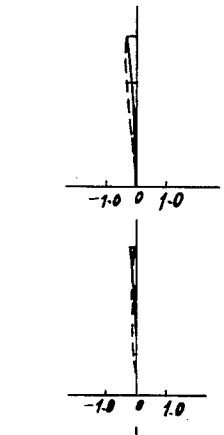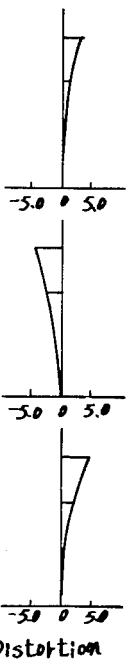
18-(a)
18-(b)
18-(c)
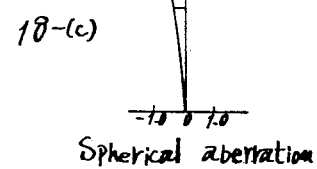
Spherical aberration    Astigmatism    Distortion

COMPACT VARIFOCAL LENS SYSTEM CAPABLE OF MACROPHOTOGRAPHY

BACKGROUND OF THE INVENTION

1. Field of the Invention

The present invention relates generally to a varifocal lens system, and more particularly, to a compact zooming lens assembly capable of macrophotography whereby extremely close-up photography can be accomplished, as well as, the normal zooming photography of an object positioned between infinity and relatively close positions to the lens system.

2. Description of the Prior Art

In the field of photography, zooming lens assemblies and macrophotography or close-up focusing assemblies are well known in the prior art. A zoom lens system that is further capable of macrophotography is disclosed in the Ogura et al, U.S. Pat. No. 3,912,376 assigned to the same assignee of the present invention. In that zoom lens system, a first front focusing lens group has a positive refractive power, while the zooming lens groups can be subdivided into positive and negative refractive powered subcomponents. To achieve macrophotography, one of the zooming lens group subcomponents can be held stationary while the other subcomponents can be moved along the optical axis to a close-up focusing position.

The Someya, U.S. Pat. No. 3,661,445, discloses a zoom lens system with macrophotography capabilities wherein a first focusing lens of positive refractive power is combined with a negative refractive power variator. In the macrophotography mode of operation, the variator lens group is held in a telephoto position and a positive refractive power lens group of the variator is shifted for focusing.

The Hirose et al, U.S. Pat. No. 3,659,921, discloses a zoom lens assembly capable of macrophotography wherein the focusing lens is shifted forward and the front group of a relay lens is shifted toward the image plane to provide the macrophotography mode of operation.

Another zoom lens assembly with macrophotography is provided in U.S. Pat. No. 3,817,600, granted to Watanabe et al., wherein a lens group in the zooming group and a lens group in the compensating group are moved in a predetermined relationship to provide a macrophotography mode of operation.

The Suzuki, U.S. Pat. No. 3,655,271 and Gela et al., U.S. Pat. No. 3,773,402, are cited of general interest to disclose varifocal lens systems with macrophotography capabilities.

The traditional design criterion for varifocal lens systems capable of macrophotography has been to provide a front lens component of positive refractive power to minimize optical design problems. A lens system, disclosed in Japanese patent application No. 68157/47, laid open to public inspection in Japan as File No. 29146/49, consists of only two lens groups with a negative front lens group and a positive rear lens group. This lens design is to provide a relatively limited capability and simple design. In each of the above cited prior art patents, the varifocal lens assembly includes generally a front focusing lens group which is positioned on the object side of the lens sustem and is of a convergent or positive refractive power. The lens systems also include a variator lens group and a compensator lens group that are generally movable for varying the focal length without a substantial image plane deviation from the focal plane. In addition, each of the above varifocal lens systems provide a particular mode of movement for at least one of the lens components to effectuate a focusing capability in the macrophotography range.

Finally, a varifocal objective lens system having a close focusing distance in the order of two to three times the absolute focal distance of the focusing group is disclosed in the Lai et al U.S. Pat. No. 3,603,669. The Lai et al varifocal lens system has a divergent front lens component, and a pair of movable lens groups filling the function of variator and compensator at the same time.

In the prior art varifocal lens systems mentioned above, the front lens component is usually movable on the optical axis for focusing an object between infinity and a relatively close position. When a convergent front lens component having positive refractive power is utilized, it must be moved a relatively large distance towards the object side of the lens system for focusing on a relatively close object. This movement creates unfavorable aberration problems for the optical designer. In addition, the diameter of a convergent front lens component must be relatively large to permit the introduction of a sufficient amount of light when the front lens component is moved forward to its extreme object side position. As can be appreciated, the diameter of the convergent front lens component must be accordingly increased if a wide angle varifocal lens system is desired. The relative axial displacement of the convergent front lens component along with the necessity of a relatively large diameter, creates a relatively large and bulky lens system.

The use of a divergent front lens focusing component can alleviate some of these aberration and size problems created by a convergent front lens component. However, heretofore, it has been generally difficult to design a varifocal lens system having adequate imaging properties with a divergent front lens component. In particular, a varifocal lens system that is capable of macrophotography has been thought to create special optical problems. To date, the prior art has not provided a varifocal lens system that is capable of macrophotography wherein a divergent front focusing lens component is combined with a variator component and a compensator component in a relatively compact lens assembly. The prior art has instead provided numerous examples of varifocal lens systems capable of macrophotography with a convergent front focusing lens component.

SUMMARY OF THE INVENTION

The present invention is directed to a compact varifocal lens assembly, and more particularly, to a zooming lens assembly capable of macrophotography. The varifocal lens assembly includes a first front lens group of overall negative refractive power, a second lens component of overall positive refractive power, and a third lens component of overall negative refractive power. Means are provided for moving selected lens components in a zooming mode of operation, and further, in a macrophotography mode of operation. The present invention provides a number of examples of different varifocal lens systems having a divergent front lens component, a variator lens component, and a compensator lens component, that are compactly assembled, and further, have the capability of providing a macrophotography mode of operation. Generally, one of the variator lens components and the compensator lens components are fixed or separated into two subcomponents that are relatively movable in the macrophotography mode of operation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGS. 1-(a), 1-(b), and 1-(c) are schematic cross-sectional views of one embodiment of the lens system of the present invention in different operative modes;

FIGS. 2-(a), 2-(b), and 2-(c) are schematic cross-sectional views of a second embodiment of the present invention;

FIG. 3 is a graph plotting the variations in lateral magnification, $\beta$, and objective distance, S, for the first and second embodiments of the present invention;

FIGS. 4-(a), 4-(b), 4-(c), and 4-(d) are schematic cross-sectional views of a third embodiment of the present invention;

FIGS. 5-(d), 5-(a), 5-(b), 5-(c), and 5-(e) are schematic cross-sectional views of a fourth embodiment of the present invention;

FIG. 6-(a) is a graph plotting the variations in lateral magnification, $\beta$, for the third and fourth embodiments of the present invention, while FIG. 6-(b) is a graph plotting the variations in objective distance, S, for the third and fourth embodiments of the present invention;

FIGS. 7-(d), 7-(a), 7-(b), and 7-(c) are schematic cross-sectional views of a fifth embodiment of the present invention;

FIGS. 8-(d), 8-(a), 8-(b), 8-(c), and 8-(e) are schematic cross-sectional views of a sixth embodiment of the present invention;

FIGS. 9-(a), 9-(b), and 9-(c) are detailed cross-sectional views of the first embodiment of the present invention;

FIG. 10 are plots of the aberrations of the lens system of the first embodiment of the present invention;

FIGS. 11-(a), 11-(b), and 11-(c) are detailed cross-sectional views of the second embodiment of the present invention;

FIG. 12 are plots of aberrations of the lens system of the second embodiment of the present invention;

FIGS. 13-(a), 13-(b), and 13-(c) are detailed cross-sectional views of the third embodiment of the present invention;

FIG. 14 are plots of the aberrations of the lens system of the fourth embodiment of the present invention;

FIGS. 15-(c), 15-(d), and 15-(e) are detailed cross-sectional views of another embodiment of the present invention;

FIGS. 16-(a), 16-(b), and 16-(c) are detailed cross-sectional views of a lens system of another embodiment of the present invention;

FIG. 17 are plots of aberrations of the lens system of FIG. 16;

FIGS. 18-(a), 18-(b), and 18-(c) are detailed cross-sectional views of another lens system embodiment of the present invention;

FIG. 19 are plots of the aberrations of the lens system of FIGS. 18;

BRIEF DESCRIPTION OF THE PREFERRED EMBODIMENTS

Figure 20:
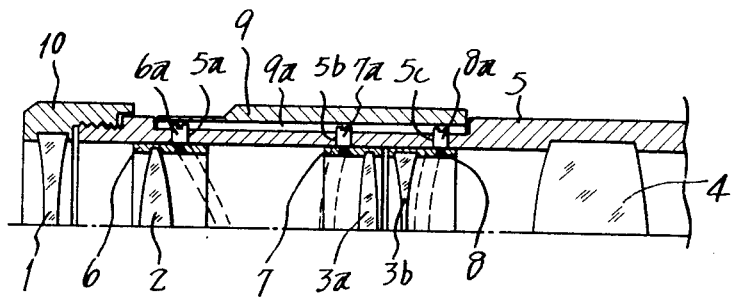
FIG. 20 is a partial cross-sectional view of a lens barrel mechanism for moving lens components in accordance with the principles of the present invention.

The following description is provided to enable any person skilled in the optical art to make and use the present invention and set forth the best modes contemplated by the inventor of carrying out his invention. Various modifications, however, will remain readily apparent to those skilled in the art, since the generic principles of the present invention have been defined herein specifically to provide a compact varifocal lens system capable of macrophotography that can be manufactured in a relatively economical manner.

The derivation of the specific lens assemblies parameters can be accomplished with the assistance of a computer. The present invention represents the parameters of a compromised balance of acceptable aberrations in a relatively easily manufactured lens assembly that is particularly suitable for use with a single lens reflex camera. The data presented herein in the Tables to be discussed subsequently, are more than adequate to permit a competent artisan in the optical art to reproduce the embodiments of the present invention.

When referring herein to a lens by the symbol G, it is to be understood, both in the specification and the claims, that the symbol is intended to be interpreted broadly enough to cover either a single lens element or an equivalent comprising a group of two or more lens elements, such as a doublet.

In the accompanying drawings, which supplement the following Tables, the lenses in accordance with the present invention, are illustrated schematically. As usual, in conventional lens diagrams, the light is assumed to travel from left to right, and the individual lenses are designated by numerals or the letter G, with a subscript indicating the position of the lenses as numbered consecutively from the object to image side. The radii of curvature of the lenses are indicated by the letter ($r$) with a subscript corresponding to the consecutive numbers of the lens elements from left to right.

In the Tables, the minus signs indicate surfaces concave toward the object side, while the surfaces without a sign are convex toward the object side. The Tables also disclose the axial spacings with either the letter, $d$, or E, along the optical axis. The value of the axial spacings between the lens elements are appropriately offset in the Tables to indicate their relative positions. All linear dimensions are given in absolute values and are given with reference to equivalent focal length of unit. The Tables also provide, with respect to each example, the field angle, $2\omega$, the F number and the focal length range, $f$. The refractive index is designated as N, while the Abbe number is V.

In the drawings, the figure number represents a particular lens system, while the subfigures represent the relative lens positions to achieve the full zooming mode of operation and the macrophotography mode of operation. The trace, or broken, lines extending between subfigures trace the relative lens movement along the optical axis to achieve lens position in the lower subfigure.

The first embodiment of the present invention is disclosed schematically as equivalent thin lens group in FIGS. 1-(a), 1-(b), and 1-(c). In each of the illustrated lens positions of FIG. 1, the first front lens component 1 is normally stationary and will have a negative overall refractive power. The divergent front lens 1 can be used, as known in the art, for focusing. The second lens component 2 is a positive refractive power variator lens which is movably mounted along the optical axis of the lens system. The third compensator lens component 3 is also movably mounted and has a negative overall refractive power. Finally, a fourth master lens component 4 is phantomed into the schematic lens system at a stationary position and has a positive overall refractive power. The focal planes for the lens systems are designated at the F position on the optical axis.

FIG. 1-(a) discloses the respective lens positions in a zoom mode of operation for an extreme telephoto position within the operative focal length range. FIG. 1-(b), shows the lens positions in the zoom operative mode for an extreme wide angle position in the operative focal length range. The loci of the respective lens components, during the normal zooming mode of operation, can be readily determined by the broken lines interconnecting FIGS. 1-(a), and 1-(b). The focusing in the macrophotography range is effected by shifting the compensator lens 3 from its extreme wide angle position in the zooming range away from the object side of the lens system to the extreme macrophotography position disclosed in FIG. 1-(c). As can be seen from the broken lines extending between FIG. 1-(b) and FIG. 1-(c), the respective lens components 1, 2 and 4 remain stationary at the relative loci of the extreme wide angle position in the zooming mode of operation, while, the compensator lens component 3 is shifted toward the image side of the lens system. Various lens barrel mechanisms for achieving the desired lens movement are known in the prior art. The term macrophotography used herein is known in the field of photography to refer to focusing with a camera at a range substantially less than a meter.

Another embodiment of the present invention is disclosed in FIGS. 2-(a), 2-(b), and 2-(c). The schematic lens arrangement is basically the same as that disclosed in FIGS. 1-(a), 1-(b), and 1-(c), except that the third compensator lens component 3 is divided into two subcomponents, a first subcomponent 3a having positive refractive power and a second subcomponent 3b having a negative refractive power. FIG. 2-(a) discloses the relative positions of the lens components in a maximum zoom mode of operation, while FIG. 2-(b) discloses the lens components in the extreme wide angle position of the zooming mode of operation. The macrophotography mode of operation is shown in FIG. 2-(c) wherein the first lens component 1, the second lens component 2 and the first lens subcomponent 3a remain stationary relative to their extreme wide angle positions, while the second lens subcomponent 3b is shifted toward the image side to effectuate the macrophotography.

The following Tables 1 and 2 disclose the respective focal lengths, $F_x$, and axial distances between lens components, $E_x$, of the respective zoom lens systems of the first two embodiments disclosed in FIGS. 1-(a), 1-(b), and 1-(c), and FIG. 2-(a), 2-(b), and 2-(c).

In Table 1, the overall focal lengths of the respective lens components 1, 2, 3, and 4, are respectively set forth as F1, F2, F3, and F4. The respective lens distances along the optical axis are set forth as E1 between lens 1 and 2, E2 between lens 2 and 3, and E3 between lens 3 and 4. These distances will vary during the normal zooming operation and are set forth in the Table.

In Table 2, the overall focal lengths of the respective lens components are also set forth with subscript numbers corresponding to their respective lens. Likewise, the distances between the respective lenses along the optical axis are also set forth with the appropriate subscript number corresponding to their respective lenses. For example, $E_1$ corresponds to the distance between lens 1 and 2. During the normal zooming mode of operation, the compensator lens moves as an integral unit, and accordingly, the distance $E_{3a}$ remains the same. The overall focal lengths of the compensator lens subcomponents 3a and 3b are determined in accordance with the following equations:

$$1/F_3 = 1/F_{3a} + 1/F_{3b} - E_{3a} \cdot 1/F_{3a} \cdot 1/F_{3b}$$

Table 1

| focal length for lens components | Axial distance between lens components | | |
|---|---|---|---|
| $F_1 = -43.784$ | | | |
| | $E_1 = 4.5$ | 13.0 | 24.5 |
| $F_2 = +28.284$ | | | |
| | $E_2 = 25.0$ | 13.07 | 5.0 |
| $F_3 = -43.284$ | | | |
| | $E_3 = 14.0$ | 17.43 | 14.0 |
| $F_4 = +38.56$ | | | |
| Total focal length for whole lens system | 55.16 | 38.71 | 27.58 |
| | extreme telephoto | medium | extreme wide angle |

Table 2

| focal length for lens components | Axial distance between lens components | | |
|---|---|---|---|
| $F_1 = -43.784$ | | | |
| | $E_1 = 4.5$ | 13.0 | 24.5 |
| $F_2 = +28.284$ | | | |
| | $E_2 = 22.98$ | 11.45 | 2.98 |
| $F_{3a} = +129.87$ | | | |
| | $E_{3a} = 1.5$ | 1.5 | 1.5 |
| $F_{3b} = -32.089$ | | | |
| | $E_{3b} = 14.5$ | 17.93 | 14.5 |
| $F_4 = +38.56$ | | | |
| Total focal length for whole lens system | 55.16 | 38.71 | 27.58 |
| | extreme telephoto | medium | extreme wide angle |

FIG. 3 is a plot of the variation of the lateral magnification $\beta$ and object distance, S, for a macrophotography mode of operation. The lateral modification $\beta$ is the resultant image size divided by the actual object size. In the plot of FIG. 3, the broken lines 1-(c) represent the variations in $\beta$ and S as measured by the respective right and left ordinate when the third lens component 3 has been shifted to the position disclosed in FIG. 1-(c). The solid lines 2-(c) represent the variations in $\beta$ and S when the negative subcomponent 3b of the third lens component in FIG. 2-(b) has been shifted to the disclosed position in FIG. 2-(c).

As can be seen in FIG. 3, from comparing the respective plots $\beta$ [1-(c)] and $\beta$[2-(c)], it is possible to increase the lateral magnification in the macrophotography range by dividing the compensator lens component into two subcomponents where $|F_{3b}| > |F_3|$. Accordingly, by the suitable selection of the focal length of the movable subcomponent, a desired lateral magnification can be effectuated. The respective curves S 1-(c) and S 2:(c) disclose the variations in object distance for the respective first and second embodiments in the macrophotography range.

Referring to Table 2 wherein $F_{3a} = 129.87$ and $F_{3b} = -32.089$, the maximum lateral magnification is about 0.09, when subcomponents $F_{3a}$ and $F_{3b}$ have been integrally shifted by 3mm toward the image side of the lens system. However, in the second embodiment and with reference to FIG. 3, the maximum lateral magnification is about 0.16 for the same 3mm of movement of only the subcomponent $F_{3b}$ toward the image side of the lens system.

A third embodiment of the present invention is schematically disclosed in FIGS. 4-(a), 4-(b), 4-(c), and 4-(d). The lens arrangement is somewhat similar to that disclosed in the embodiment of FIG. 1 wherein the maximum zoom mode of operation is shown in FIG. 4-(a) and the maximum wide angle position of the zooming mode is shown in FIG. 4-(b). The macrophotography mode of operation is shown respectively in FIGS. 4-(c) and 4-(d). More particularly, the macrophotography mode of operation can be effectuated by moving the variator second lens component 2 toward the object side of the lens system and the compensator lens component 3 to a position on the image side of the lens system that is further offset than that of the extreme wide angle position disclosed in FIG. 4-(b). In this case, the third lens component 3 may be fixed at the extreme wide angle position as shown in FIG. 4-(d).

Referring to FIG. 6-(a) and 6-(b), plots of the variation in lateral magnification β and object distances S are respectively shown in these figures for the third and fourth embodiments of the present invention. In particular, with reference to the third embodiment of the invention disclosed in FIG. 4, the curve 4-(c) represents in FIG. 6-(a) the variation in lateral magnification when the third lens component 3 has been shifted by 3mm toward the image side, while the second lens component 2 has been shifted toward the object side as shown in FIG. 4-(c). The maximum lateral magnification is approximately 0.14.

A fourth embodiment of the present invention as disclosed in FIGS. 5-(a) and 5-(b) corresponds to the schematic lens system of the second embodiment disclosed in FIGS. 2-(a) and 2-(b) wherein the third compensator lens component has been divided into two subcomponents 3a and 3b. The macrophotography mode of operation is effectuated by fixing the positive subcomponent 3a of the compensator lens component at the extreme wide angle position as shown in FIG. 5-(c) and shifting the negative subcomponent 3b from an extreme wide angle position toward the image side and also shifting a second variator lens component 2 from the extreme wide angle position to the object side of the lens system. The broken lines extending between the figures disclose the relative movement of the lenses.

Referring again to FIGS. 6-(a) and 6-(b), an increased lateral magnification can be accomplished by dividing the third compensator lens component, rather than moving it integrally. By a suitable selection of the refractive power of the respective lens components 3a and 3b, a desired lateral magnification can be accomplished in the lens system. The lens arrangement, disclosed in FIG. 5-(e), provides the maximum lateral magnification of about 0.31 when the positive subcomponent 3a in the compensator lens component and the second variator lens component 2 are integrally moved from their extreme wide angle position, as disclosed in FIG. 5-(b), toward the object side to effectuate the macrophotography. The maximum lateral magnification can also be accomplished as shown in FIG. 5-(d) by shifting the positive compensator subcomponent 3a, while holding stationary the subcomponent 3b in the extreme telephoto position, as shown in FIG. 5-(a).

Again, referring to FIG. 6-(a) and 6-(b), the respective curves 5-(d) and 5(e) represent respectively the lateral magnifications β and the object distances S for lens movements in the embodiments of FIGS. 5-(d) and 5-(e). Thus, in the fourth embodiment of the present invention, a highly effective macrophotography mode of operation can be accomplished by shifting the positive subcomponent 3a in the third lens component, either by itself or together with the second lens component, as respectively shown in FIGS. 5-(d) and 5-(e). The subcomponent 3a could be shifted on a zooming cam of a lens barrel.

A fifth embodiment of the present invention is disclosed in FIGS. 7 and the respective lens elements can be moved by a zooming cam for the macrophotography mode of operation. An illustrative lens mounting arrangement will be described subsequently in this specification. The particular focal lengths (F), and axial distances between the respective lens components (E) of the embodiment in FIGS. 7, are set forth in Table 3. FIG. 7-(a) discloses the arrangement with a maximum zoom, or extreme telephoto position, in the zooming range. FIG. 7-(b) shows the respective lens components in the zooming mode of operation at an extreme wide angle position wherein the variator lens 2 is moved toward the image side of the system.

A macrophotography mode of operation is disclosed in FIG. 7-(d) wherein the variator lens 2 is fixed at the extreme telephoto position of the zooming mode of operation, while the compensator third lens components are integrally moved, for example, by the zoom cam, to the extreme wide angle position. This particular lens arrangement may be accomplished by shifting the second lens component 2 toward the object side of the lens system independent of the variator lens position when the lens system has been shifted to the wide angle position in the zooming mode, for example, as shown in FIG. 7-(b). Alternatively, macrophotography can be accomplished by shifting the negative subcomponent 3b in the third lens component apart from the other lenses with a zooming cam motion. For example, the respective lens can be positioned in the extreme telephoto position of FIG. 7-(a) and then, the negative subcomponent 3b can be displaced toward the image side to assume a position, such as shown in FIG. 7-(c).

As an alternative arrangement of effectuating a macrophotography movement of the respective lenses, the lens mounting can be such that the variator lens 2 and the positive subcomponent 3a can be released from the wide angle position shown in FIG. 7-(b) and independently moved toward the macrophotography mode of operation shown in FIG. 7-(c). The respective dotted lines disclose the various lens movements that are possible of being accomplished, for example, with the zooming cam. The various mechanical mechanisms that accomplish these relative movements of the lenses, are within the skill of an artisan in the optical art.

The maximum lateral magnifications obtained in the various lens arrangements represented by the parameters of Table 3, are 0.33 with an objective distance S equal to 0.17m in the lens arrangement of FIG. 7-(d) and β = 0.51 with an objective distance S - 0.1m in the lens arrangement of FIG. 7-(c).

Table 3

| focal length for lens components | Axial distance between lens components | | |
|---|---|---|---|
| $F_1 = -43.83$ | | | |
| $F_2 = +22.773$ | $E_1 = 4.5$ | 13.5 | 24.5 |
| $F_{3a} = +158.73$ | $E_2 = 8.667$ | 4.34 | 2.93 |
| $F_{3b} = -42.247$ | $E_{3a} = 1.5$ | 1.5 | 1.5 |
| $F_4 = +58.873$ | $E_{3b} = 28.814$ | 24.14 | 14.551 |
| Total focal length for whole lens system | 50.0 | 35.67 | 25.0 |
| | extreme telehoto | medium | extreme wide angle |

Table 4

| focal lenth for lens components | Axial distance between lens components | | |
|---|---|---|---|
| $F_1 = -43.784$ | | | |
| $F_{2a} = +21.896$ | $E_1 = 4.5$ | 13.0 | 24.5 |
| $F_{2b} = -85.007$ | $E_{2a} = 2.667$ | 2.667 | 2.667 |
| $F_3 = -43.284$ | $E_{2b} = 25.0$ | 13.07 | 5.0 |
| $F_4 = +38.56$ | $E_3 = 14.0$ | 17.43 | 14.0 |
| Total focal length for whole lens system | 55.16 | 38.71 | 27.58 |
| | extreme telephoto | medium | extreme wide angle |

The sixth embodiment of the present invention has parameters of focal length and axial distance as set forth in Table 4 above. The lens system is schematically disclosed in FIGS. 8 and includes a variator lens that is divided into a positive subcomponent 2a and a negative subcomponent 2b. The zooming modes of operation are disclosed respectively in FIG. 8-(a) and 8-(b). The various macrophotography modes of operation are disclosed respectively in FIG. 8-(d), 8-(c) and 8-(e). The relative movements of the respective schematic lenses can be traced with the aid of the broken lines.

The macrophotography mode of operation, as shown in FIG. 8-(c), can be accomplished by releasing the positive subcomponent 2a in the normal wide angle zooming mode of operation as shown in FIG. 8-(b), and moving it toward the object side. FIG. 8-(e) diclosed another mode of macrophotography wherein the negative lens component 2b and the third compensator lens component 3 can be integrally shifted from a wide angle position in the zooming system toward the image side of the lens system. Finally, macrophotography can be acomplished by positioning the lenses as disclosed in FIG. 8-(d) wherein the negative subcomponent 2b of the variator lens component and the compensator lens component 3 can be shifted from the extreme telephoto position, as shown in FIG. 8-(a) toward the image side to the position they assumed in the extreme wide angle zooming position. This can be accomplished by releasing the negative subcomponent 2b and fixing the positive subcomponent 2a in the maximum zooming position. As can be seen from the broken lines between FIG. 8-(d) and FIG. 8-(a), the third lens component can be shifted by the normal zoom cam, or may be moved linearly along the optical axis.

The first six embodiments of the present invention are disclosed schematically to assist the reader in determining the generic principles of the present invention and their application in a varifocal lens system capable of macrophotography. In the following Tables, a detail listing of the various parameters of the lens systems that were disclosed schematically in the earlier figures are provided. In the Tables, the distances, d, that are marked with a single asterisk, are the range of distances in the zooming mode of operation, while the distances marked with a double asterisk are the range of distances associated with a macrophotography mode of operation.

The following Table 5 corresponds to the first embodiment of the invention disclosed in FIG. 1, and is shown in more detail in the cross-sectional view of the lens system of FIGS. 9.

Table 5

$f = 53.022 \sim 26.511$  F No. = 4.5  Field Angle $2\omega = 22.8° \sim 44°$

| | Radius of Curvature | Axial Distance | Refractive Index/ Abbe's Number | |
|---|---|---|---|---|
| $G_1$ | $r_1$ 79.888 | $d_1$ 1.0 | $N_1/V_1$ | 1.48749/70.1 |
| | $r_2$ 40.538 | $d_2$ 6.0 | | |
| $G_2$ | $r_3$ -33.408 | $d_3$ 1.0 | $N_2/V_2$ | 1.48749/70.1 |
| | $r_4$ 35.505 | $d_4$ 0.5 | | |
| $G_3$ | $r_5$ 44.434 | $d_5$ 2.577 | $N_3/V_3$ | 1.58267/46.43 |
| | $r_6$ 183.286 | $d_6$ 0.493~20.493* | | |
| $G_4$ | $r_7$ 127.766 | $d_7$ 4.6 | $N_4/V_4$ | 1.62041/60.29 |
| | $r_8$ -27.179 | | | |
| $G_5$ | | $d_8$ 1.0 | $N_5/V_5$ | 1.80518/25.41 |
| | $r_9$ -51.099 | $d_9$ 0.101 | | |
| $G_6$ | $r_{10}$ 49.983 | $d_{10}$ 2.859 | $N_6/V_6$ | 1.6779/55.38 |
| | $r_{11}$ -76.962 | $d_{11}$ 22.987~2.987*,** | | |
| $G_7$ | $r_{12}$ -39.175 | $d_{12}$ 1.0 | $N_7/V_7$ | 1.48749/70.1 |
| | $r_{13}$ 46.117 | $d_{13}$ 3.834~3.834*,** | | |
| P | $r_{14}$ ∞ | $d_{14}$ 7.85 | $N_p/V_p$ | 1.5168/64.04 |
| | $r_{15}$ ∞ | $d_{15}$ 0.5 | | |
| $G_8$ | $r_{16}$ 27.203 | $d_{16}$ 1.7 | $N_8/V_8$ | 1.72124/38.04 |
| | $r_{17}$ -64.008 | $d_{17}$ 4.7 | | |
| $G_9$ | $r_{18}$ -17.657 | $d_{18}$ 1.0 | $N_9/V_9$ | 1.74/28.28 |
| | $r_{19}$ 32.968 | $d_{19}$ 1.8 | | |
| $G_{10}$ | $r_{20}$ 445.167 | $d_{20}$ 2.342 | $N_{10}/V_{10}$ | 1.6935/53.39 |
| | $r_{21}$ -15.553 | | | |

As shown in FIGS. 9-(a), 9-(b), and 9-(c), lenses G1, G2, and G3, constitute the first lens component, while lenses G4, G5, and G6, constitute the variator or second lens component. The negative lens G7 is the third, or compensator lens component, the phantom optical element, P, represents a prism, while the fourth, or master lens component, comprises the lenses G8, G9, and G10.

The intralens distances which vary during the zooming mode of operation during normal photography, are D6, D11, and D13, as disclosed in Table 5. During the macrophotography mode of operation, the compensator lens G7 is shifted toward the image side as shown in FIG. 9-(c) for focusing. The objective distance, S, is 0.26m when the lens, G7, is shifted from the extreme wide angle position of FIG. 9-(b) by 3mm towards the image side, while the lateral magnification is 0.1. Referring to FIG. 10, a series of aberration curves disclosing the spherical aberration, astigmatism, and percent of distortion are provided for the extreme telephoto position of FIG. 9-(a), the extreme wide angle zoom position of FIG. 9-(b) and the extreme macrophotography position of FIG. 9-(c).

The following Table 6 provides the detailed lens parameters associated with the second embodiment schematically shown in FIGS. 2, and more particularly, disclosed in detail in FIGS. 11. Table 6 is also of relevance to the embodiments of FIGS. 15 and 16.

Table 6

| | Radius of Curvature | Axial Distance | Refractive Index/Abbe's Number |
|---|---|---|---|
| | $f = 55.16 \sim 27.58$ | F No. = 4.5 | Field Angle $2\omega = 22° \sim 42.4°$ |
| $G_1$ | $r_1$ 96.023 | | |
| | | $d_1$ 1.2 | $N_1/V_1$ 1.62588/35.7 |
| | $r_2$ 95.812 | | |
| | | $d_2$ 2.72 | |
| $G_2$ | $r_3$ −39.769 | | |
| | | $d_3$ 1.0 | $N_2/V_2$ 1.48749/70.1 |
| | $r_4$ 69.259 | | |
| | | $d_4$ 0.887 | |
| $G_3$ | $r_5$ 366.946 | | |
| | | $d_5$ 1.0 | $N_3/V_3$ 1.48749/70.1 |
| | $r_6$ 101.649 | | |
| | | $d_6$ 0.245~20.245* | |
| $G_4$ | $r_7$ 61.071 | | |
| | $r_8$ −30.472 | $d_7$ 4.6 | $N_4/V_4$ 1.62041/60.29 |
| $G_5$ | $r_9$ −50.545 | $d_8$ 1.0 | $N_5/V_5$ 1.80518/25.41 |
| | | $d_9$ 0.101 | |
| $G_6$ | $r_{10}$ 55.966 | | |
| | $r_{11}$ −158.228 | $d_{10}$ 2.5 | $N_6/V_6$ 1.6779/55.38 |
| | | $d_{11}$ 20.756~0.756* | |
| $G_7$ | $r_{12}$ 125.972 | | |
| | $r_{13}$ −125.0 | $d_{12}$ | $N_7/V_7$ 1.48749/70.1 |
| | | $d_{13}$ 0.5 | 3.5** |
| $G_8$ | $r_{14}$ −36.872 | | |
| | $r_{15}$ 28.863 | $d_{14}$ | $N_8/V_8$ 1.48749/70.1 |
| | | $d_{15}$ 3.187~3.187* (~0.187)** | |
| P | $r_{16}$ ∞ | | |
| | $r_{17}$ ∞ | $d_{16}$ 7.85 | $N_p/V_p$ 1.67003/47.15 |
| | | $d_{17}$ 0.5 | |
| $G_9$ | $r_{18}$ 25.32 | | |
| | $r_{19}$ −81.875 | $d_{18}$ 1.7 | $N_9/V_9$ 1.72124/38.04 |
| | | $d_{19}$ 4.7 | |
| $G_{10}$ | $r_{20}$ −17.523 | | |
| | $r_{21}$ 30.732 | $d_{20}$ 1.0 | $N_{10}/V_{10}$ 1.74/28.28 |
| | | $d_{21}$ 1.8 | |

Table 6-continued

| | Radius of Curvature | Axial Distance | Refractive Index/Abbe's Number |
|---|---|---|---|
| | $f = 55.16 \sim 27.58$ | F No. = 4.5 | Field Angle $2\omega = 22° \sim 42.4°$ |
| $G_{11}$ | $r_{22}$ 313.676 | | |
| | $r_{23}$ −14.716 | $d_{22}$ 2.49 | $N_{11}/V_{11}$ 1.6935/53.39 |

As can be seen in the maximum, or extreme, telephoto position of FIG. 11-(a), the first lens group constitutes lens elements G1, G2, and G3. The second variator lens group constitutes lens elements G4, G5, and G6. The third compensator lens group constitutes elements G7 and G8, while the fourth, or master lens group, constitutes lens elements G9, G10, and G11, FIG. 11-(b) discloses the extreme wide angle position of the lens system in the zooming mode of operation. During the zooming mode of operation, the distances between G7 and G8 are 0.5, while the distances D6 and D11 vary during the normal zooming operation, as can be seen by referring to Table 6 and the broken lines extending between the various lens elements in FIGS. 11-(a) and 11-(b). In the macrophotography mode of operation, as shown in FIG. 11-(c), the lens G8 alone, is shifted toward the image side for focusing. In the macrophotography mode of operation, the objective distance, S, is 0.16m when the lens G8 has been shifted by 3mm toward the image side, while the resulting lateral magnification is 0.15. The family of aberration curves for the lens system of FIG. 11 is disclosed in FIG. 12 wherein FIG. 11-(a) discloses the aberrations associated with the maximum, or extreme, telephoto position in the zooming mode; FIG. 11-(d) discloses the extreme wide angle position in the zooming mode and FIG. 11-(c) discloses the aberrations associated with the macrophotography mode.

The following Table 7 provides the detailed lens parameters associated with the third embodiment of the present invention schematically shown in FIGS. 4, and more specifically, shown in lens system depicted in FIGS. 13.

Table 7

| | Radius of Curvature | Axial Distance | Refractive Index/Abbe's Number |
|---|---|---|---|
| | $f = 55.16 \sim 27.58$ | F No. = 4.5 | Field Angle $2\omega = 22° \sim 42.4°$ |
| $G_1$ | $r_1$ 97.31 | | |
| | $r_2$ 104.653 | $d_1$ 1.2 | $N_1/V_1$ 1.62588/35.7 |
| | | $d_2$ 2.286 | |
| $G_2$ | $r_3$ −48.675 | | |
| | $r_4$ 69.259 | $d_3$ 1.0 | $N_2/V_2$ 1.48749/70.1 |
| | | $d_4$ 0.887 | |
| $G_3$ | $r_5$ 366.939 | | |
| | $r_6$ 65.182 | $d_5$ 1.0 | $N_3/V_3$ 1.48749/70.1 |
| | | $d_6$ 0.553~20.553*,** | |
| $G_4$ | $r_7$ 61.071 | | |
| | $r_8$ −30.472 | $d_7$ 4.6 | $N_4/V_4$ 1.62041/60.29 |
| $G_5$ | $r_9$ −50.545 | $d_8$ 1.0 | $N_5/V_5$ 1.80518/25.41 |
| | | $d_9$ 0.101 | |

Table 7-continued f = 55.16~27.58   F No. = 4.5   Field Angle 2ω = 22°~42.4°

| Radius of Curvature | | Axial Distance | Refractive Index/ Abbe's Number | |
|---|---|---|---|---|
| G6 | r10 55.966 | | | |
| | | d10 2.5 | N6/V6 | 1.6779/55.38 |
| | r11 −158.229 | | | |
| | | d11 22.417~2.412*,** | | |
| G7 | r12 −40.636 | | | |
| | | d12 1.0 | N7/V7 | 1.48749/70.1 |
| | r13 44.246 | | | |
| | | d13 | 3.697~3.697* (~0.697)** | |
| P | r14 ∞ | | | |
| | | d14 7.85 | Np/Vp | 1.67003/70.1 |
| | r15 ∞ | | | |
| | | d15 0.1 | | |
| G8 | r16 24.165 | | | |
| | | d16 1.7 | N8/V8 | 1.72124/38.04 |
| | r17 −68.689 | | | |
| | | d17 4.7 | | |
| G9 | r18 −16.716 | | | |
| | | d18 1.0 | N9/V9 | 1.74/28.28 |
| | r19 28.721 | | | |
| | | d19 1.8 | | |
| G10 | r20 1181.68 | | | |
| | | d20 2.466 | N10/V10 | 1.6935/53.39 |
| | r21 −14.278 | | | |

The first lens group comprises the lenses G1, G2, and G3, while the second, or variator, lens group comprises the lenses G4, G5, and G6. A single compensator lens G7 is provided along with a master lens group G8, G9, and G10. The movement of the lens components are depicted in the figures by the broken lines traced between the various group positions to achieve both zooming and macrophotography. The maximum zoom, or extreme telephoto position, is shown in FIG. 13-(a), while the extreme wide angle position in the zooming mode is shown in FIG. 13-(b). The macrophotography mode is disclosed in FIG. 13-(c) wherein the third lens component G7 is shifted toward the image side and fixed at a suitable position, while the second lens component (G4, G5, and G6) is moved toward the object side for focusing. Alternatively, the movement of the second lens component toward the object side may be coordinated, or carried out, in cooperation with the shifting of the third lens component G7 toward the image side. In the macrophotography mode of operation, the objective distance, S, when the third component G7 is shifted by 3mm toward the image side from the extreme wide angle position and the second lens component is shifted by 10mm toward the object side is 0.28m, while the lateral magnification of the system is 0.14.

FIG. 14 discloses the various aberration curves associated with the extreme telephoto position, FIG. 13-(a), extreme wide angle position FIG. 13-(b) and the macrophotography position FIG. 13-(c).

As mentioned earlier, the lens parmeters of Table 6 relate to the zoom lens systems disclosed in FIGS. 15. In this regard, FIG. 15-(c), FIG. 15-(d), and FIG. 15-(e) disclose the various positions of the lenses in a macrophotography mode of operation. The actual movement of the respective individual lens components, illustrated in FIG. 15-(c), FIG. 15-(d), and FIG. 15-(e), correspond to the schematic illustration of the lens movement in FIGS. 5-(c), 5-(d), and 5-(e), respectively. The first group of lenses comprises the element G1, G2, and G3. The second variator group of lenses comprises G4, G5, and G6, while the third compensator lens group includes lenses G7 and G8. The master lens components are designated as G9, G10, and G11. As can be appreciated from the figures, the third group, or compensator lens group comprises a pair of positive and negative subcomponent lenses G7 and G8, respectively.

Referring specifically to FIG. 15-(c), the positive subcomponent G7 is held relatively stationary at its operative extreme wide angle position in the zooming mode and the negative subcomponent lens G8 is shifted toward the image side, for example, by 3mm. The second lens group is shifted by 10mm toward the object side. In this particular macrophotography mode of operation, the object distance, S, will be 0.2m, while the resultant lateral magnification of the lens system is 0.18.

The macrophotography lens arrangement of FIG. 15-(d) is analogous to the shifting of the schematic lens components in FIG. 5-(a) to FIG. 5-(d). The positive subcomponent lens G7 in the third group has been shifted from an extreme telephoto position in the zooming mode of operation, toward the object side. In this lens arrangement, the objective distance, S, is 0.26m when the lens G7 has been shifted by 15mm with the resultant lateral magnification of 0.21. The final macrophotograhy lens arrangement of this embodiment, is shown in FIG. 15-(e) and has been previously illustrated in conjunction with the schemtic embodiment in FIG. 5-(b) and FIG. 5-(e). In this embodiment, the second lens group (G4, G5, and G6) and the positive subcomponent G7 of the third lens group are integrally shifted from an extreme wide angle position in the zooming mode of operation toward the object side of the lens system. The objective distance is 0.13m when the lens group is shifted by 10mm, while the resultant lateral magnification of the lens system is 0.26.

In the embodiment of FIGS. 16, lens G1, G2 and G3 represent the first lens group, while lenses G4, G5, and G6 represent the second lens group. Lenses G7 and G8 represent the third lens component, while the master lens group is represented by lenses G9, G10, and G1. The lens parameters of this system are the same as that shown in Table 6. FIG. 16-(a) represents the relative lens group arrangement in the maximum zoom extreme telephoto position of the lens system, while FIG. 16-(b) represents the extreme wide angle lens group arrangement in the zooming mode of operation. The relative movement of the lens groups can be determined from the broken lines extending between the respective figures.

During the lens movement in the normal zooming operation, the third lens group, that is lenses G7 and G8, are shifted integrally but in a non-linear relation relative to that of the second lens group. This can be determined from the relative curvature of the broken lines between the two lens group positions disclosed in the adjacent figures. When a macrophotography mode of operation is desired, the positive lens G7 and the negative lens G8 are positioned relatively apart on the optical axis. This can be advantageously accomplished by first placing the lenses in the extreme wide angle zooming position, and then displacing both the second group and the positive lens G7 toward the object side of the lens system. The relative movements of the second lens group and the positive lens G7 are non-linear as depicted by the broken lines extended between FIG. 16-(b) and FIG. 16-(c). In the macrophotography position of FIG.

16-(c), the objective distance, S, is 0.28m, while the lateral magnification of the lens system is 0.13. The aberration curves resulting from the various modes of operation of the embodiment of FIGS. 16, are disclosed in FIG. 17.

As a variation, it would be possible to shift both the second lens group and the positive lens G7 from the extreme wide angle zooming mode position shown in FIG. 16-(b) integrally toward the object side to provide macrophotography. This motion would be somewhat similar to the arrangement that was previously described with respect to the embodiment of FIG. 5-(e). The maximum lateral magnification obtainable in this variation of the embodiment of FIG. 16, would be about 0.3. The refractive powers of the positive lens G7 and the negative lens G8 in the third lens group are respectively $1/F_{3a} = 0.0077$ and $1F_{3b} = -0.0311$. If, however, the refractive power of the negative lens G8 is increased, then there would result an increased maximum lateral magnification with the same lens shifting movement.

The sixth embodiment of the present invention as schematically set forth in FIGS. 8, is disclosed in greater detail in the detailed cross-sectional view presented in FIGS. 18. The specific lens parameters can be found in the following Table 8.

Table 8

| Radius of Curvature | Axial Distance | Refractive Index/ Abbe's Number |
|---|---|---|
| $f = 55.16 \sim 27.58$ | F No. = 4.5 | Field Angle $2\omega = 22° \sim 42.6°$ |
| $r_1$ −603.246 | | |
| G$_1$ | $d_1$ 1.0 | $N_1/V_1$ 1.48749/70.1 |
| $r_2$ 511.065 | | |
| | $d_2$ 3.41 | |
| $r_3$ −60.631 | | |
| G$_2$ | $d_3$ 1.0 | $N_2/V_2$ 1.48749/70.1 |
| $r_4$ 38.04 | | |
| | $d_4$ 1.883~21.883*,** | |
| $r_5$ 49.976 | | |
| G$_3$ | $d_5$ 4.392 | $N_3/V_3$ 1.62041/60.29 |
| $r_6$ −28.891 | | |
| G$_4$ | $d_6$ 1.0 | $N_4/V_4$ 1.80518/25.41 |
| $r_7$ −48.422 | | |
| | $d_7$ 0.1 | |
| $r_8$ 41.362 | | |
| G$_5$ | $d_8$ 3.011 | $N_5/V_5$ 1.6779/55.38 |
| $r_9$ −78.774 | | |
| | $d_9$ 2.667** | |
| $r_{10}$ −101.821 | | |
| G$_6$ | $d_{10}$ 1.0 | $N_6/V_6$ 1.6/64.38 |
| $r_{11}$ 101.821 | | |
| | $d_{11}$ 20.201~0.201*,** | |
| $r_{12}$ −51.947 | | |
| G$_7$ | $d_{12}$ 1.0 | $N_7/V_7$ 1.5168/64.04 |
| $r_{13}$ 29.913 | | |
| G$_8$ | $d_{13}$ 1.0 | $N_8/V_8$ 1.80518/25.41 |
| $r_{14}$ 35.461 | | |
| | $d_{14}$ 7.924~7.924*,** | |
| $r_{15}$ 21.568 | | |
| G$_9$ | $d_{15}$ 1.7 | $N_9/V_9$ 1.71736/29.38 |
| $r_{16}$ −104.537 | | |
| | $d_{16}$ 4.7 | |
| $r_{17}$ −18.935 | | |
| G$_{10}$ | $d_{17}$ 1.0 | $N_{10}/V_{10}$ 1.74/28.28 |
| $r_{18}$ 24.78 | | |
| | $d_{18}$ 1.0 | |

Table 8-continued

| Radius of Curvature | Axial Distance | Refractive Index/ Abbe's Number |
|---|---|---|
| $f = 55.16 \sim 27.58$ | F No. = 4.5 | Field Angle $2\omega = 22° \sim 42.6°$ |
| $r_{19}$ 113.116 | | |
| G$_{11}$ | $d_{19}$ 1.0 | $N_{11}/V_{11}$ 1.80518/25.41 |
| $r_{20}$ 33.196 | | |
| G$_{12}$ | $d_{20}$ 4.0 | $N_{12}/V_{12}$ 1.6935/53.39 |
| $r_{21}$ −15.46 | | |

In the lens system of Table 8 and FIGS. 18, the first lens group includes lens elements G1 and G2, while the second zooming lens group includes lens elements G3, G4, G5, and G6. The compensator, or third lens grou0p, comprises lens elements G7 and G8, while the master lens group includes lens elements G9, G10, G11, and G12.

FIG. 18-(a) disclosed the maximum zoom, or extreme telephoto position, in the zooming mode of operation, while FIG. 18-(b) discloses the extreme wide angle position in the zooming mode of operation. As can be seen group the broken line trace, the compensator lens moves during the zooming mode of operation from an initial position to return to the same position at both focal length limits of the zooming range. In the macrophotography mode of operation represented in FIG. 18-(c), a negative subcomponent 2b along with the compensator lens component 3, are held stationary in the extreme wide angle position and the positive lens group subcomponent 2a is moved toward the object side to effectuate the macrophotography range FIG. 19 discloses, respectively, the spherical aberration, astigmatism and distortion of the lens system of Table 8 for the respective positions shown in FIGS. 18-(a), 18-(b), and 18-(c).

Various different lens mounting arrangements and mechanisms for moving the lens components can be utilized to effectuate the purposes of the present invention. For purposes of illustration, a partial cross-sectional view of a lens barrel is disclosed in FIG. 20. The lens system includes a negative focusing lens 1, a positive variator lens 2, and a compound negative compensator lens, including a first positive subcomponent 3a and a second negative subcomponent 3b. Finally, a master lens 4 completes the lens system. A mounting tube 5 supports the master lens component 4 and further, carriers a series of cam slots 5a, 5b, and 5c, better seen in FIG. 21. A rotatable tube 6 carries the variator lens component 2 and includes a pin 6a which extends through the cam slot 5a in the tube 5. Respective movable tubes 7 and 8 carry the positive subcomponent 3a and the negative subcomponent 3b, respectively. The movable tube 7 has a pin 7a which extends through the cam slot 5b, while the movable tube 8 has a pin 8a extending through the cam slot 5c. An exterior control tube 9 is mounted over the lens tube 5 and is provided with an interior surface axial groove 9a that extends parallel to the optical axis of the lens system. The respective heads of the pins 6a, 7a, and 8a are mounted within the interior groove 9a of the control tube 9. Finally, a focusing ring 10 mounts the negative first lens component 1 and is movable attached to the tube 5 through a threaded connection.

In operation, the focusing of an object position between infinity and a relatively close position, can be effectuated by the rotation of the focusing ring 10. The zooming operation and the focusing in the macrophotography mode is effectuated by the rotation of the control tube 9. When the control tube 9 is rotated, the movable mounting tubes 6, 7, and 8 are rotated by means of the engagement of the respective pins 6a, 7a, and 8a with the parallel groove 9a on the control tube 9. The direction of movement of the tubes 6, 7, and 8 relative to the longitudinal axis, are controlled by the respective cam slots 5a, 5b, and 5c.

Figure 21:
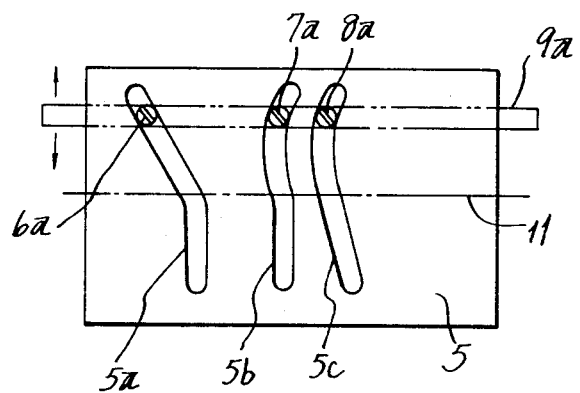
FIG. 21 is a schematic plan veiw of the lens tube and cam slots of FIG. 20.

FIG. 21 discloses a schematic view of the parallel groove 9a and a plan view of the tube 5 with its respective cam slots. When the control tube 9 is rotated, the position of the groove 9a in the control tube 9 is shifted as noted by the arrows in FIG. 21. During this movement, the respective pins 6a, 7a, and 8a are moved along the cam slots 5a, 5b, and 5c, respectively. The center line 11 discloses the demarkation between the zooming mode of operation and the macrophotography mode of operation. On the upper area of the tube 5, the variator lens 2 is shifted to the image side by virtue of the slope of the cam 5a, and its interaction with the pin 6a. The compound compositor lens, which includes the subcomponents 3a and 3b, are integrally shifted along the optical axis as a unit in the parabolic relationship disclosed by the concentric configurations of the cam slots 5b and 5c in the upper area of the tube 5. As the parallel groove 9a sweeps the upper area of the tube 5, the zooming mode of operation is effectuated from a maximum zoom, or extreme telephoto position, to an extreme wide angle position. As the control tube 9 sweeps the groove 9a beyond the extreme wide angle position, and accordingly, across the demarkation 11, a macrophotography mode of operation is provided. In the lower area of tube 5, the cam slots 5a and 5b are designed to track respectively, the pins 6a and 7a in imaginary planes both perpendicular to the optical axis. Cam slot 5c, however, is inclined toward the image side of the lens system, and accordingly, the pin 8a and its respective negative subcomponent lens 3b, will be tracked away from the other lenses. In the macrophotography mode of operation, the respective tubes 6 and 7 are fixed at one position on the optical axis and only tube 8 and its lens element 3b will be shifted to effectuate the focusing in the macrophotography range.

As is apparent from the above description, a lens component can be moved by a cam slot, and further, can be apparently fixed when the follower pin is within a cam slot extending in an imaginary plane perpendicular to the optical axis. In addition, any two lens components can be integrally moved as a unit by two cam slots having identical configurations. The term lens group or lens component is used generally in the above specification and following claims and can comprise one or more actual lens elements.

As mentioned above, the particular mounting and movement of the lens elements disclosed in FIGS. 20 and 21, are offered as only an illustration of a manner of effecuating the movements of the present invention. Any artisan skilled in the field of optics can provide a desired movement to specific lens components by other known mechanisms in the prior art, once taught the principles of the present invention. Accordingly, the scope of the present invention should be determined from the following claims:

What is claimed is:

1. A compact varifocal lens system capable of both a zooming and macrophotography mode of operation having a predetermined focal plane comprising:

a first front lens component of overall negative refractive power;

a second lens component of overall positive refractive power movable along an optical axis on the image side of said first front lens component;

a third lens component of overall negative refractive power movable along the optical axis on the image side of said second lens component; and mounting means for said second and third lens components to provide a first mode of movement to vary the total focal length of the lens system without significant image-plane deviation and a second mode of movement to provide image-plane deviation for the purpose of focusing in the macrophotography range, one of said second and third lens components consists of positive and negative subcomponents, the negative subcomponent being located on the image side of the positive subcomponent, said subcomponents capable of being combined as a unit in said first mode and are separable from each other in said second mode.

2. A varifocal lens system as defined in claim 1, wherein said third lens component consists of a positive subcomponent and a negative subcomponent movable relatively to said positive subcomponent on the image side thereof, said mounting means includes means for moving said second and third lens components in a predetermined relationship with said positive and negative subcomponents moved as a unit of movement to vary the total focal length in a normal photography range, and a second means including means for separating said negative and positive subcomponents from each other in a second mode of movement for macrophotography.

3. A varifocal lens system as defined in claim 2, wherein said second means further includes means for moving said negative subcomponent and means for fixing said second lens components and said positive subcomponent as said negative subcomponent is moved in said second mode of movement.

4. A varifocal lens system as defined in claim 3, wherein said moving means of said second means moves said negative subcomponent toward the image side of the lens system.

5. A varifocal lens system as defined in claim 2, wherein said second means further includes means for moving said positive subcomponent and means for fixing said second lens component and said negative subcomponent as said positive subcomponent is moved in said second mode of movement.

6. A varifocal lens system as defined in claim 2, wherein said second means further includes means for moving said second lens component and means for separating and fixing said positive and negative subcomponents as said second lens component is moved in said second mode of movement.

7. A varifocal lens system as defined in claim 2, wherein said second means further includes means for moving said second lens component and said negative subcomponent and means for fixing said positive subcomponent as said second lens component and said negative subcomponent are moved in said second mode of movement.

8. A varifocal lens system as defined in claim 2, wherein said second means further includes means for moving said second lens component and said positive subcomponent as a unit and means for fixing said negative subcomponent as said second lens component and said positive subcomponent are moved in said second mode of movement.

9. A varifocal lens system as defined in claim 2, wherein said second means further includes means for moving said second lens component and said positive subcomponent in a predetermined relationship and means for fixing said negative subcomponent as said second lens component and said positive subcomponent are moved in said second mode of movement.

10. A varifocal lens system as defined in claim 1, wherein said second lens component consists of a positive subcomponent and a negative subcomponent movably mounted relative to said positive subcomponent at the image side thereof, said mounting means includes means for moving said second and third lens components in predetermined relationship with said positive and negative subcomponents moved as a unit in said first mode of movement and a second means including means for separating said negative and positive subcomponents from each other in said second mode of movement.

11. A varifocal lens system as defined in claim 10, wherein said second means further includes means for moving said positive subcomponent and means for fixing said negative subcomponent and said third lens component as said positive subcomponent is moved in said second mode of movement.

12. A varifocal lens system as defined in claim 10, wherein said second means further includes means for moving said negative subcomponent and said third lens component as a unit and means for fixing said positive subcomponent as said negative subcomponent and said third lens component are moved in said second mode of movement.

13. A varifocal lens system as defined in claim 10, wherein said second means further includes means for moving said negative subcomponent and said third lens component in a predetermined relationship and means for fixing said positive subcomponent as said negative subcomponent and said third lens component are moved in said second mode of movement.

14. A varifocal lens system as defined in claim 1, wherein said first front lens component is shiftable along the optical axis for focusing in said first mode of movement.

15. A varifocal lens system as defined in claim 1, further comprising a fourth master lens component positioned at the image side of said third lens component.

16. A relatively compact varifocal lens system capable of macrophotography comprising:
a first front lens component of overall negative refractive power;
a second lens component of overall positive refractive power movable along an optical axis on the image side of said first front lens component;
a third lens component of overall negative refractive power movable along the optical axis on the image side of said second lens component;
first means for giving a first mode of movement to at least some of said second and third lens components to vary the total focal length of the lens system in a normal photography range; and
second means for giving a second mode of movement to at least some of said second and third lens components to provide a macrophotography range of focusing including moving means for moving said third lens component toward the image side of the lens system and fixing said second lens component as said third lens component is moved for focusing in the macrophotography range.

17. A relatively compact varifocal lens system capable of macrophotography comprising:
a first front lens component of overall negative refractive power;
a second lens component of overall positive refractive power movable along an optical axis on the image side of said first front lens component;
a third lens component of overall negative refractive power movable along the optical axis on the image side of said second lens component;
first means for giving a first mode of movement to at least some of said second and third lens components to vary the total focal length of the lens system in a normal photography range; and
second means for giving a second mode of movement to at least some of said second and third lens components to provide a macrophotography range of focusing including means for moving said second lens component toward the object side and fixing said third lens component as said second lens component is moved for focusing in the macrophotography range.

18. A varifocal lens system as defined in claim 17, wherein said second means is capable of fixing said third lens component at a position shifted toward the image side from its normal photographic movable range during macrophotography.

19. A compact varifocal lens system capable of macrophotography comprising the following design parameters:

| f = 53.022 ~ 26.511 | F/4.5 | field angle 2ω = 22.8° ~ 44° | |
|---|---|---|---|
| Radius of Curvature | | Axial Distance | Refractive Index/ Abbe's Number |
| $r_1$ | 79.888 | | |
| $r_2$ | 40.538 | $d_1$ 1.0 | $N_1/V_1$ 1.48749/70.1 |
| $r_3$ | −33.408 | $d_2$ 6.0 | |
| $r_4$ | −35.505 | $d_3$ 1.0 | $N_2/V_2$ 1.48749/70.1 |
| $r_5$ | 44.434 | $d_4$ 0.5 | |
| $r_6$ | 183.286 | $d_5$ 2.577 | $N_3/V_3$ 1.58267/46.43 |
| $r_7$ | 127.766 | $d_6$ 0.493 ~ 20.493* | |
| $r_8$ | −27.179 | $d_7$ 4.6 | $N_4/V_4$ 1.62041/60.29 |
| $r_9$ | −51.099 | $d_8$ 1.0 | $N_5/V_5$ 1.80518/25.41 |
| $r_{10}$ | 49.983 | $d_9$ 0.101 | |
| $r_{11}$ | −76.962 | $d_{10}$ 2.859 | $N_6/V_6$ 1.6779/55.38 |
| $r_{12}$ | −39.175 | $d_{11}$ 22.987 ~ 2.987*,** | |
| $r_{13}$ | 46.117 | $d_{12}$ 1.0 | $N_7/V_7$ 1.48749/70.1 |
| $r_{14}$ | ∞ | $d_{13}$ 3.834 ~ 3.834*,** | |
| $r_{15}$ | ∞ | $d_{14}$ 7.85 | $N_p/V_p$ 1.5168/64.04 |
| | | $d_{15}$ 0.5 | |

-continued

| f = 53.022 ~ 26.511 | F/4.5 | field angle 2ω = 22.8° ~ 44° | | |
|---|---|---|---|---|
| Radius of Curvature | | Axial Distance | | Refractive Index/ Abbe's Number |
| $G_8$ | $r_{16}$ 27.203 | | | |
| | | $d_{16}$ 1.7 | $N_8/V_8$ | 1.72124/38.04 |
| | $r_{17}$ −64.008 | | | |
| | | $d_{17}$ 4.7 | | |
| $G_9$ | $r_{18}$ −17.657 | | | |
| | | $d_{18}$ 1.0 | $N_9/V_9$ | 1.74/28.28 |
| | $r_{19}$ 32.968 | | | |
| | | $d_{19}$ 1.8 | | |
| $G_{10}$ | $r_{20}$ 445.167 | | | |
| | | $d_{20}$ 2.342 | $N_{10}/V_{10}$ | 1.6935/53.39 |
| | $r_{21}$ −15.553 | | | |

* * * * *

UNITED STATES PATENT AND TRADEMARK OFFICE
CERTIFICATE OF CORRECTION

PATENT NO. : 4,054,371
DATED : October 18, 1977
INVENTOR(S) : Mitsuo Yasukuni

It is certified that error appears in the above-identified patent and that said Letters Patent are hereby corrected as shown below:

Col. 1, line 65 delete "sustem" and insert --system--.

Col. 4, line 51 delete "unit" and insert --unity--.

Col. 4, line 65 delete "group" and insert --groups--.

Col. 11, line 39 the number "-30.472" should be on line 40 next to "$r_8$"

Col. 11, line 41 the number "-50.545" should be on line 42 next to "$r_9$"

Col. 13, line 59 delete "parmeters" and insert --parameters--.

Col. 14, line 42 delete "G1" and insert --G11--.

Col. 16, line 17 delete "grou0p" and insert --group--.

Col. 16, line 64 delete "movable" and insert --movably--.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*